US009766342B2

(12) United States Patent
Tysowski et al.

(10) Patent No.: US 9,766,342 B2
(45) Date of Patent: *Sep. 19, 2017

(54) GPS PRE-ACQUISITION FOR GEOTAGGING DIGITAL PHOTOS

(71) Applicant: BlackBerry Limited, Waterloo (CA)

(72) Inventors: Piotr Konrad Tysowski, Waterloo (CA); Ngoc Bich Ngo, Ottawa (CA); David Noel Vanden Heuvel, Ottawa (CA)

(73) Assignee: BlackBerry Limited, Waterloo (CA)

( * ) Notice: Subject to any disclaimer, the term of this patent is extended or adjusted under 35 U.S.C. 154(b) by 461 days.

This patent is subject to a terminal disclaimer.

(21) Appl. No.: 14/490,004

(22) Filed: Sep. 18, 2014

(65) Prior Publication Data

US 2015/0061932 A1   Mar. 5, 2015

Related U.S. Application Data

(63) Continuation of application No. 13/930,589, filed on Jun. 28, 2013, now Pat. No. 8,866,669, which is a
(Continued)

(51) Int. Cl.
*G01S 19/14* (2010.01)
*G01S 19/25* (2010.01)
(Continued)

(52) U.S. Cl.
CPC ............ *G01S 19/14* (2013.01); *G01S 19/258* (2013.01); *G01S 19/42* (2013.01);
(Continued)

(58) Field of Classification Search
CPC ........ G01S 19/14; G01S 19/258; G01S 19/42; H04N 1/00323; H04N 5/23229
(Continued)

(56) References Cited

U.S. PATENT DOCUMENTS 6,321,158 B1 * 11/2001 DeLorme ............... G01C 21/26
340/995.16
6,434,484 B1   8/2002 Lee
(Continued)

FOREIGN PATENT DOCUMENTS

EP   0959418 A2   11/1999
EP   1720030 A1   11/2006
(Continued)

OTHER PUBLICATIONS

European Patent Office, Summons to Attend Oral Hearing for Application No. 12170972.9, issued on Mar. 18, 2016.
(Continued)

*Primary Examiner* — Harry Liu
(74) *Attorney, Agent, or Firm* — Moffat & Co.

(57) ABSTRACT

A handheld electronic device, such as a GPS-enabled wireless communications device with an embedded camera, a GPS-enabled camera-phone or a GPS-enabled digital camera, determines whether ephemeris data needs to be obtained for geotagging digital photos taken with the device. By monitoring user activity with respect to the camera, such as activation of the camera, the device can begin pre-acquisition of a GPS position fix by obtaining needed ephemeris data before the photograph is actually taken. This GPS pre-acquisition improves the likelihood that a position fix (GPS lock) is achieved by the time the photo is taken (to enable immediate geotagging). Alternatively, the photo can be geotagged retroactively by appending the current location to the metadata tag associated with the digital photo. An optional acquisition status indicator can be displayed on a user interface of the device to indicate that a position fix is being obtained.

67 Claims, 13 Drawing Sheets

Related U.S. Application Data continuation of application No. 13/429,583, filed on Mar. 26, 2012, now Pat. No. 8,477,066, which is a continuation of application No. 12/914,189, filed on Oct. 28, 2010, now Pat. No. 8,144,055, which is a continuation of application No. 12/020,714, filed on Jan. 28, 2008, now Pat. No. 7,847,729.

(51) Int. Cl.
*G01S 19/42* (2010.01)
*H04N 5/232* (2006.01)
*H04N 1/00* (2006.01)

(52) U.S. Cl.
CPC ..... *H04N 1/00323* (2013.01); *H04N 5/23229* (2013.01); *H04N 1/00127* (2013.01); *H04N 2201/0084* (2013.01); *H04N 2201/3253* (2013.01); *H04N 2201/3274* (2013.01)

(58) Field of Classification Search
USPC .................................................. 342/357.52
See application file for complete search history.

(56) References Cited

U.S. PATENT DOCUMENTS

| | | |
|---|---|---|
| 6,995,792 B1 | 2/2006 | Ogura |
| 2004/0130626 A1 | 7/2004 | Ouchi et al. |
| 2004/0174434 A1* | 9/2004 | Walker ............. G06F 17/30265 348/211.3 |
| 2005/0210110 A1 | 9/2005 | Li |
| 2005/0275726 A1* | 12/2005 | Abraham ............. G01S 5/0036 348/207.99 |
| 2006/0007315 A1 | 1/2006 | Singh |
| 2006/0090359 A1 | 5/2006 | Bork |
| 2006/0187317 A1* | 8/2006 | Montulli ............. H04N 5/2251 348/231.5 |
| 2007/0168376 A1* | 7/2007 | Luitjens ............ G06F 17/30265 |
| 2007/0211143 A1 | 9/2007 | Brodie et al. |
| 2007/0244634 A1 | 10/2007 | Koch et al. |
| 2008/0147730 A1* | 6/2008 | Lee .................... G06Q 30/0212 |
| 2008/0218407 A1 | 9/2008 | Norda et al. |
| 2008/0297409 A1 | 12/2008 | Klassen et al. |
| 2008/0301180 A1 | 12/2008 | Klassen et al. |
| 2009/0102713 A1 | 4/2009 | Sanchez et al. |
| 2009/0171568 A1* | 7/2009 | McQuaide, Jr. ....... G01C 21/36 701/411 |

FOREIGN PATENT DOCUMENTS

| | | |
|---|---|---|
| EP | 1840763 A1 | 10/2007 |
| EP | 1879373 A1 | 1/2008 |
| JP | 2001166366 A | 6/2001 |
| JP | 2003244709 A * | 8/2003 |
| JP | 2009116795 A * | 5/2009 |
| WO | 2004059966 A1 | 7/2004 |
| WO | 2005001714 A1 | 1/2005 |

OTHER PUBLICATIONS

European Patent Office, Examination Report for Application No. 12170972.9, issued on Apr. 1, 2015.
Canadian Intellectual Property Office, Office Action on Application No. 2,651,421, Issued on Apr. 12, 2011.
European Patent Office, Extended European Search Report on Application No. 08150732.9, Issued on Oct. 9, 2008.
European Patent Office, Extended European Search Report on Application No. 08152102.3, Issued on Jun. 25, 2008.
"The Ricoh 500SE GPS-ready Digital Camera-Capture Location Data with Your Images", http://www.ricohsolutions.com/geo/, accessed on Oct. 30, 2007.
Juhong Liu, "Extracting Semantic Location from Outdoor Positioning Systems", Mobile Data Management, 2006, MDM 2006 7th International Conference, XP010917947, May 10, 2006.
Canadian Intellectual Property Office, Office Action on Application No. 2,651,421, Issued on Mar. 14, 2012.
European Patent Office, Office Action on Application No. 08150732.9, Issued on Jun. 7, 2010.
European Patent Office, Office Action on Application No. 08150732.9, Issued on Nov. 17, 2010.
European Patent Office, Extended European Search Report for Application No. 17160948.0, dated Jun. 16, 2017.

* cited by examiner

| Tag | Value |
|---|---|
| Manufacturer | ABC Digital Corp. |
| Model | Quick Pix 1.0 |
| Date and Time | 2007:11:19 17:30:05 |
| Exif Version | 2.1 |
| Exposure Time | 1/659 sec. |
| F Number | f/4.0 |
| Compression | JPEG |
| X-Resolution | 72.00 |
| Y-Resolution | 72.00 |
| Focal Length | 20.1 mm |
| PixelXDimension | 2240 |
| PixelYDimension | 1680 |
| Latitude | 45 deg 54.314 min N |
| Longitude | 77 deg 30.987 min W |

*FIG. 6*

Camera Options

Default Flash Setting: Automatic

White Balance: Automatic

Picture Size: Large (1600 x 1200)

Picture Quality: Superfine

Color Effect: Normal

Geotagging: | Enabled | Disabled |

Store Pictures: On Media Card

Folder: .../BlackBerry/pictures/

*FIG. 12*

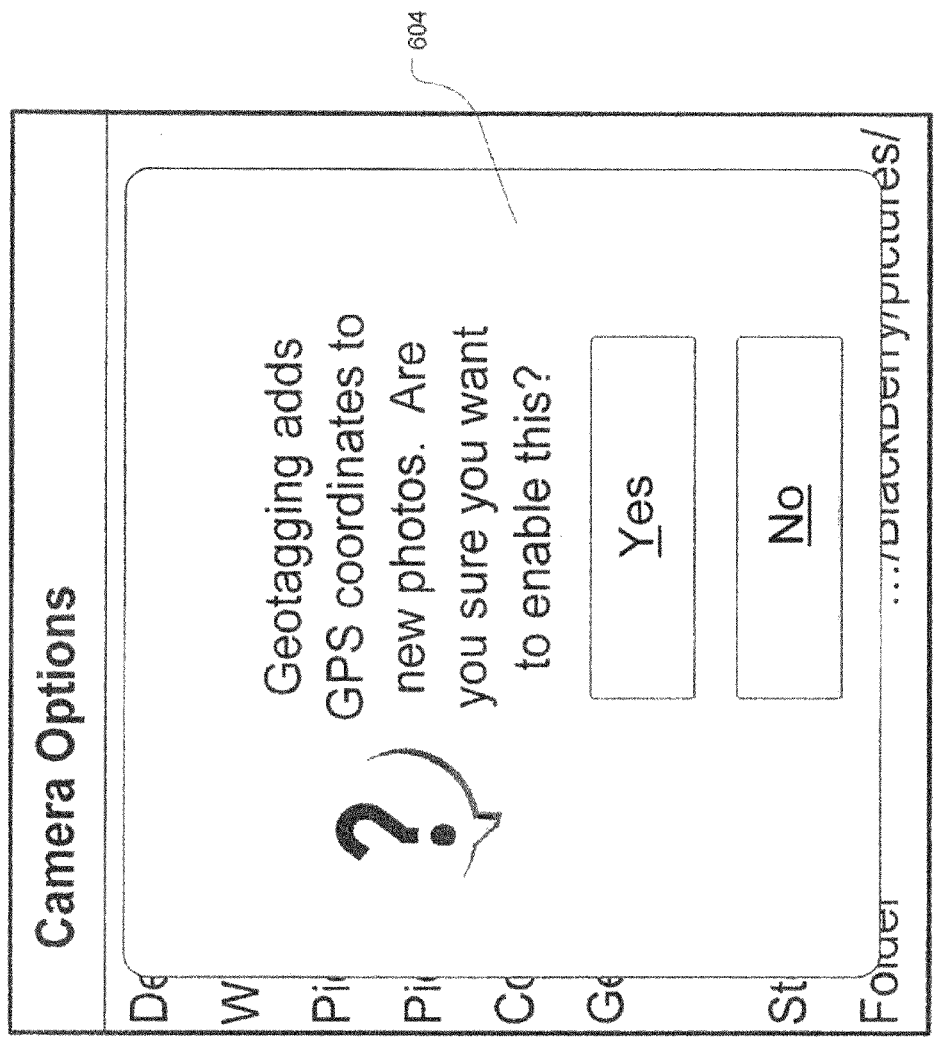

GPS PRE-ACQUISITION FOR GEOTAGGING DIGITAL PHOTOS

CROSS-REFERENCE TO RELATED APPLICATIONS

This application is a continuation of U.S. patent application Ser. No. 13/930,589 filed Jun. 28, 2013, which is a continuation of U.S. patent application Ser. No. 13/429,583 filed Mar. 26, 2012 (now U.S. Pat. No. 8,477,066), which is a continuation of U.S. patent application Ser. No. 12/914,189 filed Oct. 28, 2010 (now U.S. Pat. No. 8,144,055), which is a continuation of U.S. patent application Ser. No. 12/020,714 filed Jan. 28, 2008 (now U.S. Pat. No. 7,847,729).

TECHNICAL FIELD

The present disclosure relates generally to handheld electronic devices equipped with digital cameras and, in particular, to geotagging techniques for such devices.

BACKGROUND

Some of the new generation of handheld electronic devices include both a camera and a Global Positioning System (GPS) receiver chipset. Examples of these handheld electronic devices include GPS-enabled wireless communications devices, PDA Pocket PCs or tablets, GPS-enabled camera-phones or smart phones, and GPS-enabled cameras. These devices can be made "location-aware" by virtue of a GPS receiver that is either embedded as a GPS chipset or connected externally, e.g. a Bluetooth™-enabled GPS puck.

The combination of GPS and camera features enables "geotagging" {or "geocoding") of digital photographs, i.e. tagging digital photos with geographical information indicative of the location at which the photo was taken. For example, the geotagging may involve appending coordinates of longitude and latitude to a metadata tag, e.g. an Exchangeable Image File Format (EXIF) tag, that is associated with the digital photo.

Conventionally, for geotagging to be accurate and meaningful, the GPS receiver should be locked at the time the photo is taken, i.e. the GPS receiver must have acquired a position fix, so that the current position data (e.g. position coordinates) can be written to the metadata tag associated with the digital photo.

As is known in the art, a GPS lock or position fix is acquired by synchronizing with at least four GPS satellite vehicles in orbit. The time required to compute the location on a new synchronization is known as the time-to-first-fix (TTFF). Unfortunately, the TTFF can be frustratingly long for various reasons, including poor sky access (e.g. the urban canyon effect or dense overhead foliage) or out-of-date almanac or ephemeris data on start-up.

In order to be able to find the satellites initially, a GPS receiver normally requires an almanac of satellite location data that is imprecise but valid for several months. If a full reset occurs, then downloading the full almanac takes 12.5 minutes, with a maximum wait of 25 minutes. The almanac serves as a rough approximation of satellite location. To acquire a precise fix, the device must also obtain ephemeris data from each satellite itself which consists of very precise orbital and clock correction data, at a slow 50 bytes per second for a total of 12 seconds for ephemeris and 6 seconds for clock corrections. When the device retrieves this data directly from a satellite broadcast, it is operating in autonomous or standalone GPS mode, the most common mode of operation. The ephemeris data is cached by the receiver, but it becomes stale and unusable within 3 to 4 hours due to satellite drift due to various sources of error. If the wireless handheld device loses synchronization because, for example, the user enters a building or subway and the ephemeris becomes stale, then a warm or cold start condition occurs and new ephemeris must be downloaded again through a full sky search.

In addition to the latency involved in the data download, obstructions in the signal path can further prolong the TTFF. Satellites broadcast their ephemeris every 30 seconds, 5 times per window. If the signal is interrupted, the receiver must wait for another cycle. Obtaining a fix can easily take several minutes or much longer if the user is travelling through an urban canyon or dense foliage. On a hot start, where current ephemeris data is still available, the time required to obtain a fix is reduced to seconds. However, on a warm start, if a user turns on the handheld device or emerges from a building so that the receiver has no valid ephemeris data in memory, then the user may typically need to wait a few minutes before a fix is established. Of course, if both the almanac and ephemeris is out-dated, i.e. a cold start, then the TTFF can be frustratingly long.

These TTFF delays preclude the immediate geotagging of photos. If the user wishes to take a geotagged photo, the camera either remains locked ("frozen') until the GPS position fix is obtained, or the photo is taken without GPS lock, in which case the photo cannot be geotagged at that point because a GPS fix is unavailable. Thus, if, after the photo is taken, the user moves substantially away from the geographical location where the photo was taken, then any subsequent GPS position fix is potentially of limited positional accuracy in attempting to retroactively geotag the photograph.

BRIEF DESCRIPTION OF THE DRAWINGS

Further features and advantages of the present technology will become apparent from the following detailed description, taken in combination with the appended drawings, in which:

FIG. 6 is an example of a simplified EXIF tag used for geotagging digital photos;

FIG. 12 depicts an example of a camera options interface showing a plurality of camera-related settings, including, again by way of example, a setting for enabling or disabling the geotagging feature; and FIG. 13 depicts an example of a dialog box that pops up when the geotagging feature is enabled.

It will be noted that throughout the appended drawings, like features are identified by like reference numerals.

DETAILED DESCRIPTION

Figure 1:
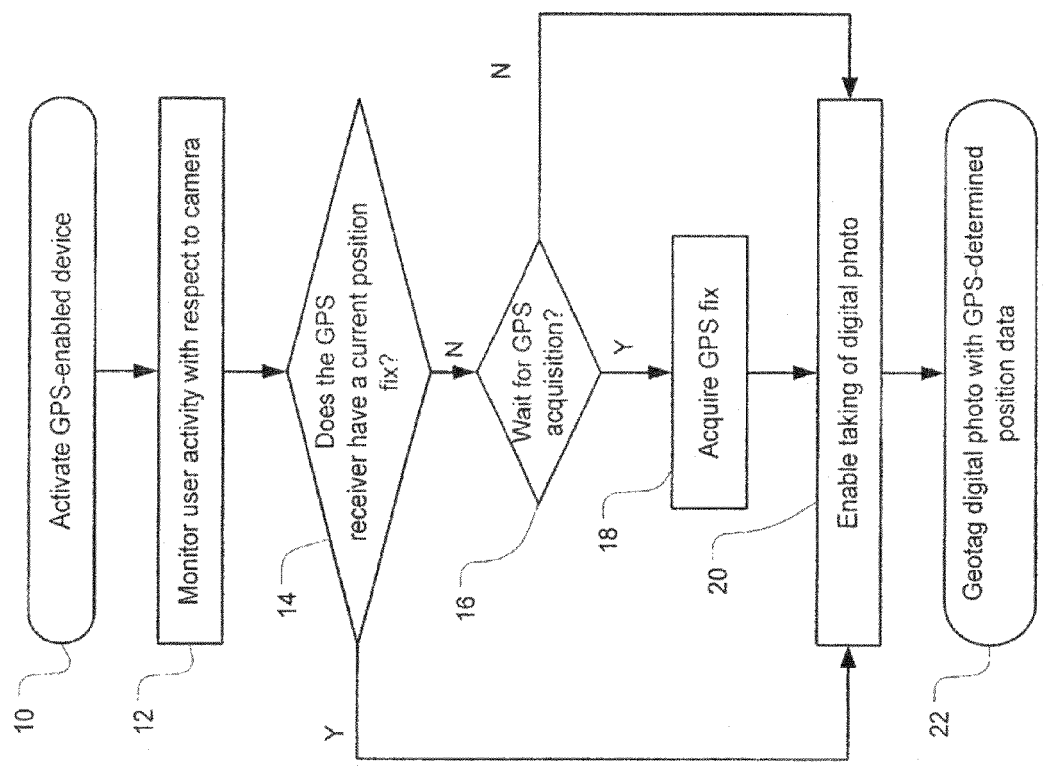
FIG. 1 is a flowchart outlining some of the main steps of a method of downloading ephemeris data for efficiently geotagging digital photo.

The present technology provides, in general, a handheld electronic device, such as, for example, a GPS-enabled wireless communications device with an embedded camera, a GPS-enabled camera-phone or a GPS-enabled digital camera, that is configured to pre-acquire a GPS position fix for geotagging photos. Pre-acquisition of a GPS position fix involves initiating acquisition of the GPS position fix in anticipation of the taking of a photo with the camera-enabled device so that geotagging of the photo can proceed expeditiously. In particular implementations, the device is configured to determine whether ephemeris data needs to be obtained for geotagging digital photos taken with the onboard camera of the device. By monitoring user activity with respect to the camera, such as activation of the camera by a user of the device, the device can begin pre-acquisition of a GPS position fix by obtaining any needed ephemeris data before the photograph is actually taken. This GPS pre-acquisition improves the likelihood that a position fix (GPS lock) is achieved by the time the photo is taken (to enable immediate geotagging of the digital photo). Alternatively, the photo can be geotagged retroactively by appending the GPS-determined current location to the metadata tag associated with the digital photo, An optional acquisition status indicator can be displayed on a user interface of the device to indicate that a position fix is being obtained, to indicate that accurate geotagging is being performed, or alternatively to warn the user that geotagging will be inaccurate or impossible because the time elapsed between the taking of the picture and the acquisition of the GPS position fix is too long.

Thus, a main aspect of the present technology is a method of geotagging using a handheld electronic device, the method comprising monitoring user activity with respect to a digital camera on the device, prior to the digital camera taking a digital photograph, initiating acquisition of current position data for a current position of the device, and geotagging the digital photograph with the current position data.

In one implementation of this aspect of the technology, the method involves obtaining ephemeris data for a GPS-enabled handheld electronic device. This particular implementation of the method includes steps of monitoring user activity with respect to a digital camera on the device, determining whether ephemeris data is needed for acquiring a GPS position fix, obtaining the ephemeris data in order to acquire the GPS position fix representative of a current location of the device, and geotagging a digital photo taken by the digital camera with the current location of the device.

Another main aspect of the present technology is a computer readable medium that includes code that causes the device to perform the foregoing method when the code on the computer readable medium is loaded into memory and executed on a processor of a handheld electronic device.

Yet another main aspect of the present technology is a handheld electronic device having a receiver for obtaining current position data for a current position of the device from signals received from a satellite-based navigation-signal broadcast system, a digital camera for taking a digital photograph, and a memory coupled to a processor that is configured to monitor user activity with respect to the digital camera, to cause the receiver to initiate acquisition the current position data prior to the digital camera taking the digital photograph, and to geotag the digital photograph using the current position data.

In one implementation of this aspect of the technology, the device has a GPS receiver or receiving GPS radio signals from orbiting GPS satellites and for further receiving ephemeris data for the GPS satellites, a camera for taking a digital photo, and a processor coupled to memory for monitoring user activity with respect to the camera and for determining whether ephemeris data needs to be obtained for geotagging the digital photo based on a GPS position fix acquired for a current location.

The details and particulars of these aspects of the technology will now be described below, by way of example, with reference to the attached drawings.

FIG. 1 is a flowchart outlining some of the main steps of a method of obtaining ephemeris data for a GPS-enabled handheld electronic device.

For the purposes of this specification, the expression "handheld electronic device" is meant to encompass a broad range of portable or mobile devices such as wireless communications devices, PDA Pocket PCs or tablets equipped with GPS, GPS-enabled camera-phones or smart phones, GPS-enabled cameras, etc. These devices can be made "location-aware" by virtue of a GPS receiver that is either embedded as a GPS chipset or connected externally, e.g. a Bluetooth™-enabled GPS puck.

Although the present disclosure refers to expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

As depicted in FIG. 1, after activating the GPS-enabled handheld electronic device (introductory step 10), the novel method includes a step 12 of monitoring user activity with respect to a digital camera on the device. For example, user activity with respect to the camera could involve activating the camera feature on the device by clicking on a camera icon, selecting a camera function from an onscreen menu, or pressing a dedicated button on the device that activates the camera, i.e. either turns on the camera or wakes it up where it was previously dormant. Thus, monitoring of user activity with respect to the camera may involve having a user monitoring application running on the device in the background that detects user input related to the camera. The user monitoring application, which will also be described later, can then report user activity related to the camera to the operating system or to an intermediate manager that initiates acquisition of a GPS position fix prior to a digital photo being taken by the camera. Initiating the process of acquiring a GPS fix before the camera takes the photo will be referred to herein as "GPS pre-acquisition." For example, this pre-acquisition may entail querying the GPS driver and/or GPS cache to determine whether the GPS is locked or, in specific variants of the technology, to determine whether ephemeris data is fresh or stale. Thus, at step 14, a decision is made as to whether the GPS receiver has a current position fix. Optionally, this may entail determining whether ephemeris data is needed for acquiring the GPS position fix. In other words, at step 14, a decision is made as to whether a position fix has to be acquired in order to geotag a digital photograph taken with the camera. It should be understood that step 14 is optional in the sense that, in some implementations, the application would (upon detecting camera-related activity) simply request a GPS fix without inquiring about the state of the GPS receiver, i.e. whether the receiver actually has a current fix or not, or whether updated ephemeris is needed. In other words, in some implementations, the GPS receiver would either (i) automatically obtain an instantaneous hot fix or (ii) proceed to download ephemeris data if it is not in hot start mode. The application would thus simply await indication that GPS acquisition was complete.

If, at optional step 14, it is determined that a position fix is currently available, then operations proceed to step 20 wherein the device enables the user to take the photo. Thereafter, at step 22, the photo is geotagged by writing position data into the metadata tag associated with the photo, as will be elaborated below. On the other hand, if at step 14, a determination is made that the GPS receiver does not have a current position fix, e.g. that new ephemeris data is required in order to acquire a GPS fix, then the device optionally determines at step 16 whether it should wait for a GPS position fix to be acquired or whether it should proceed immediately to step 20 to enable the digital photo to be taken right away. Alternatively, instead of step 16, the device could immediately begin the process of acquiring the GPS fix (and optionally obtaining the ephemeris data, if needed, in order to acquire the GPS position fix) without making any explicit inquiry about the availability of a current GPS position fix. If, at step 16, a decision is made to await acquisition of the GPS position fix, the device then acquires the position fix at step 18, optionally by first obtaining any needed ephemeris data. Once the GPS position fix is acquired at step 18, operations proceed to step 20 at which point the device can take the digital photo and then, at step 22, geotag the digital photo taken by the digital camera with the current location of the device. In other words, as depicted in FIG. 1, once the decision to obtain a new fix is made at step 14, an optional additional decision may be made at step 16 as to whether or not to wait for GPS acquisition to be completed before enabling the taking of a photo. Even if a GPS position fix has not yet been acquired, the device can nonetheless enable the taking of a photo right away, with an optional warning (to the effect that the GPS fix has not yet been acquired), and then append the GPS position data after the photo has been taken (provided, optionally, that the elapsed time between the taking of the photo and the acquisition of the GPS fix is not too great, in which case the position data appended to the metadata tag of the photo will be so inaccurate as to be of limited usefulness.) Thus, as depicted in FIG. 1, if the device is configured to proceed with the taking of a photo without GPS lock, then operations proceed to steps 20 and 22 wherein the photo is taken and geotagged, respectively. Alternatively, as depicted in FIG. 1, if the device is configured such that it must await a GPS fix prior to enabling the taking of the picture, then operations proceed to step 18 for acquiring the GPS position fix (GPS lock). Either way, the resultant photograph can be geotagged with the current location (e.g. by writing the coordinates of latitude and longitude to a metadata tag associated with the photo). As noted in the preceding paragraph, by monitoring camera-related activities, the device predicts that a GPS position fix will be required and begins pre-acquisition of the GPS fix, which need not involve any explicit determination as to whether the GPS fix is current or whether the ephemeris data is fresh or stale. In other words, the GPS receiver can simply be wakened for initiating the process of acquiring (i.e. "pre-acquiring") a GPS fix in anticipation of a probable geotagging event. Thus, this GPS pre-acquisition may or may not entail determining whether ephemeris data is needed for acquiring a GPS position fix and obtaining the ephemeris data in order to acquire the GPS position fix representative of a current location of the device.

Alternatively, instead of writing the location data to the metadata tag, such as an EXIF tag, the device can create a separate geotag file that stores all the geographical data and cross-references each set of geographical data with each of the digital photos stored in memory on the device. In other words, a dedicated geotag file would store each digital photo file name (e.g. Picture0001.jpg) with a set of GPS coordinates or other location data (e.g. Lat=xx.xx.xx, Lon=xx.xx.xx). Alternatively, two separate files could be used with an index, code or other means to associate the photo files with each set of position data (stored in a separate position data file).

The foregoing method steps can be implemented as coded instructions in a computer program product. In other words, the computes program product is a computer-readable medium upon which software code is recorded to perform the foregoing steps when the computer program product is loaded into memory and executed on the microprocessor of the handheld electronic device.

Figure 2:
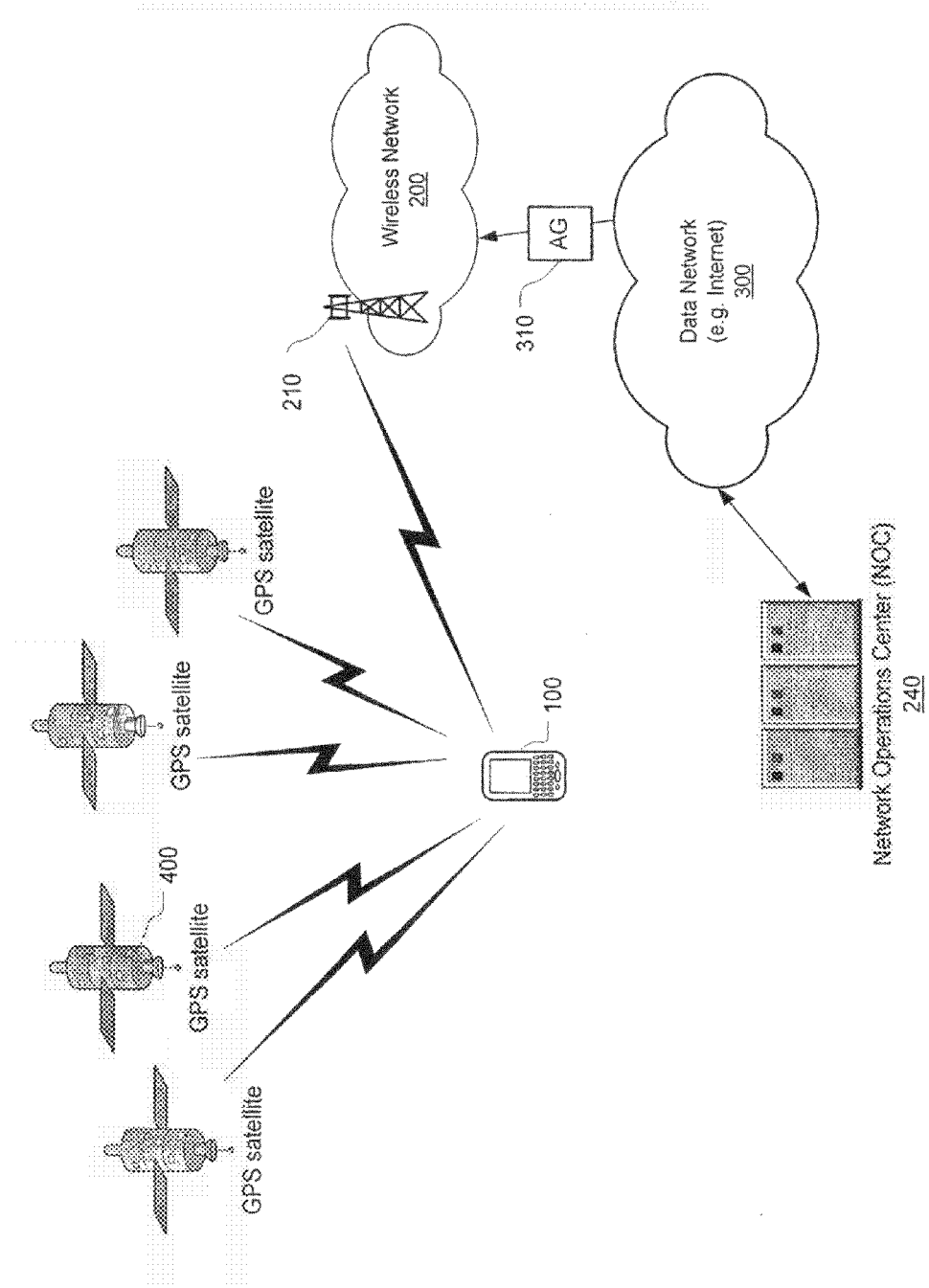
FIG. 2 is a schematic depiction of some of the main network components used to deliver ephemeris data to a wireless communications device presented as one example of a handheld electronic device on which the present technology can be implemented.
Figure 3:
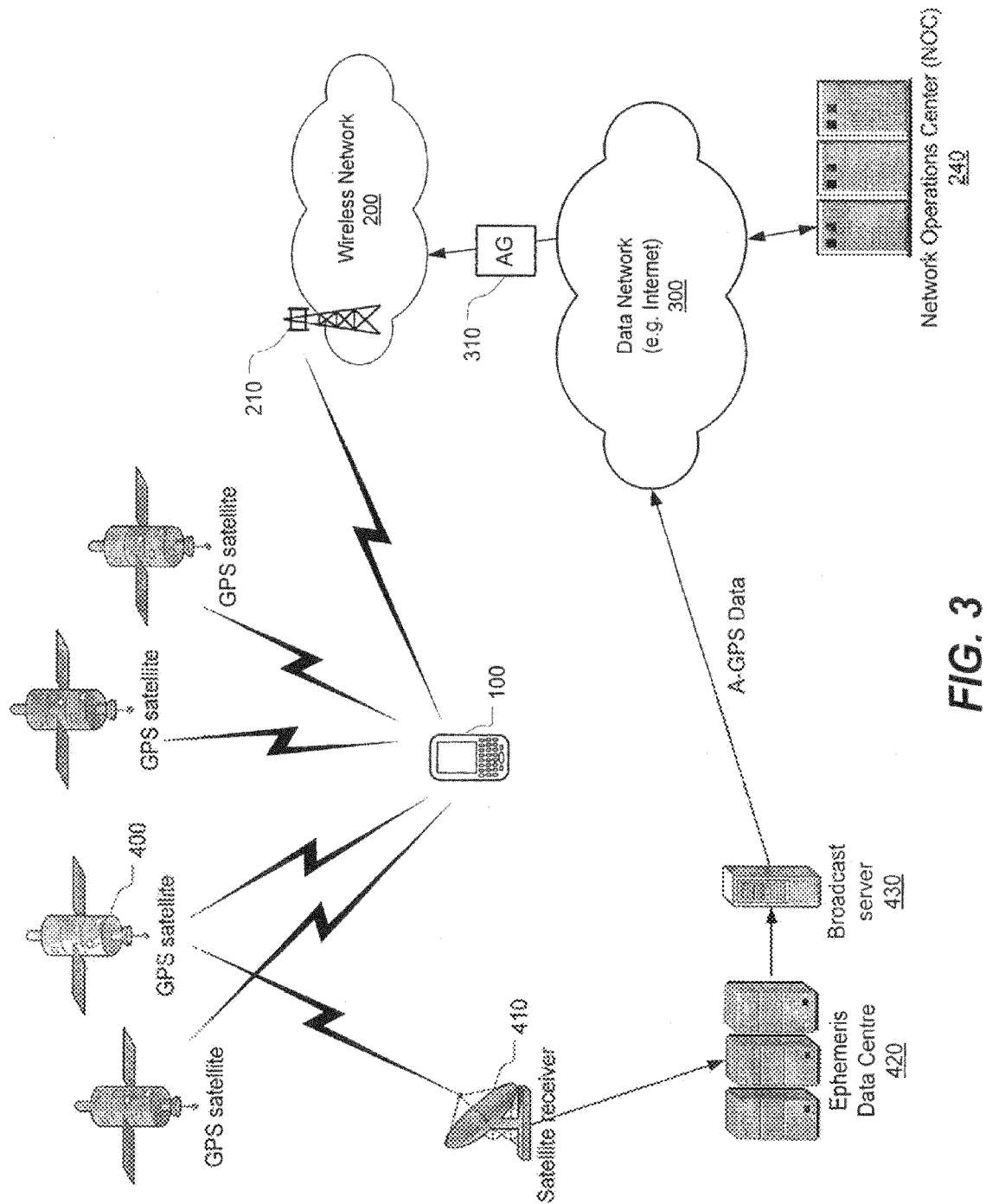
FIG. 3 is a schematic depiction of some of the main network components used to deliver ephemeris data via Assisted GPS to a handheld electronic device.
Figure 4:
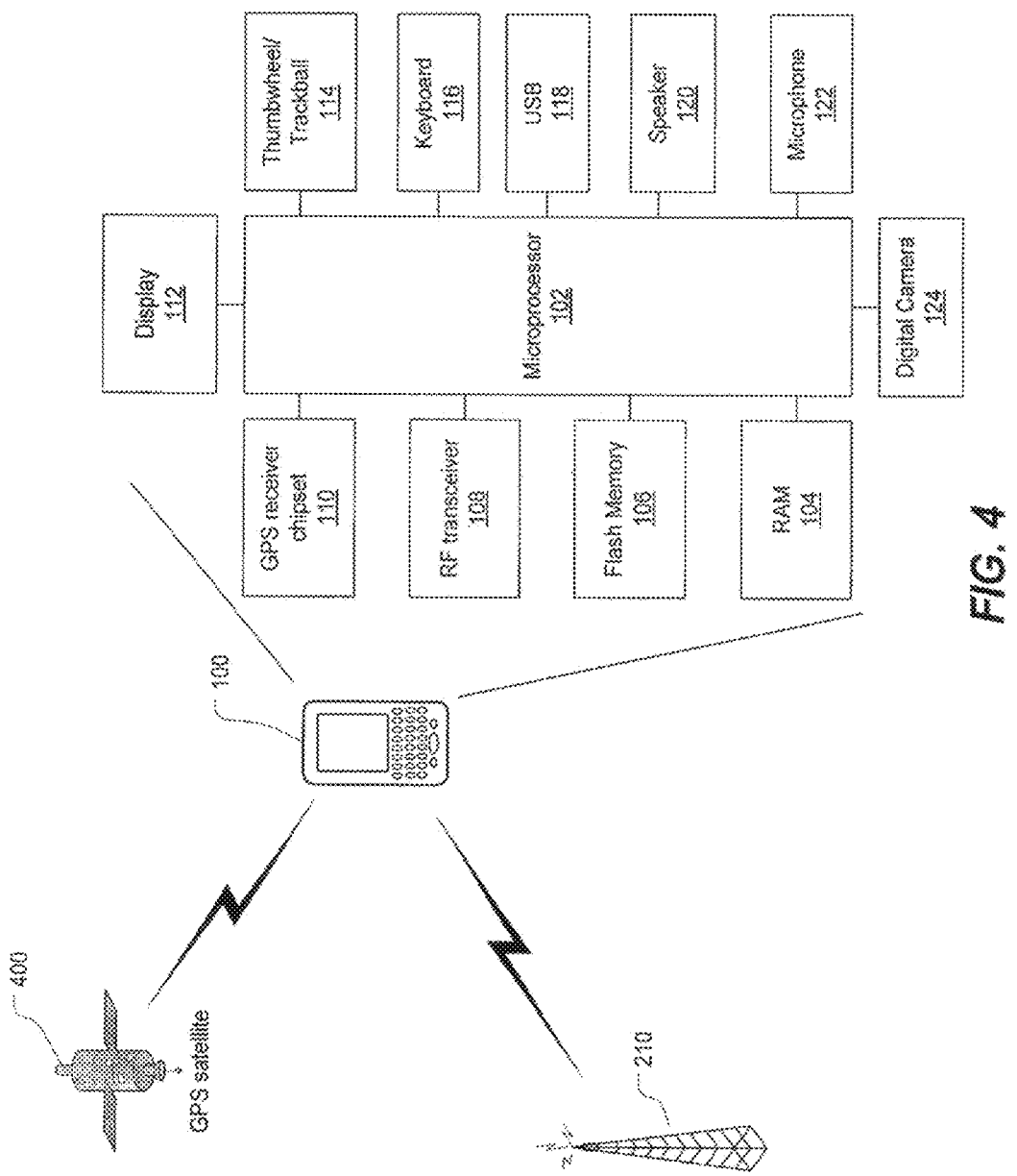
FIG. 4 is a block diagram depicting certain key components of an exemplary GPS-enabled wireless communications device presented as one example of a handheld electronic device on which the present technology can be implemented.

The foregoing method can also be implemented on one of the example networks shown in FIG. 2 or FIG. 3 and/or on the example handheld electronic device presented in FIG. 4. It should, of course, be appreciated that this novel method can be implemented on any number of other wireless networks or on any number of other GPS- and camera-enabled devices with or without wireless (i.e. cellular) connectivity. For example, this technology can be implemented on a GPS-enabled camera that does not have a RF transceiver for wireless communication. However, in specific implementations that take advantage of Assisted GPS, a wireless transceiver would be required to receive assistance data.

FIG. 2 is a schematic depiction of exemplary network components that enable a GPS-enabled wireless communications device 100 or other GPS-enabled handheld electronic device to geotag digital photographs taken using a camera in the device. It bears repeating that the wireless communications device 100 is presented merely as one example of a handheld electronic device on which the present technology can be implemented. As shown in FIG.

2, the wireless communications device 100 can communicate over voice and data channels with a base station 210 that is part of a wireless network 200. The wireless network 200 is connected to a data network (e.g. the Internet) 300. Optionally, an Applications Gateway (AG) 310 can be provided between the data network 300 and the wireless network 200 to mediate and optimize the data flow by mapping complex data structures to structures optimized for wireless and vice versa. Optionally, the wireless communications device 100 is communicatively connected to a relay or Network Operations Center (NOC) 240 using e-mail push techniques that are now well known in the art. As further depicted in FIG. 2, the GPS-enabled wireless communications device 100 is made "location-aware" by virtue of GPS radio signals received from at least four orbiting GPS satellites 400, as is also well understood in the art.

FIG. 3 is a schematic depiction of some of the main network components used to deliver ephemeris data (for Assisted GPS) to a handheld electronic device, such as, for example the GPS-enabled wireless communications device 100 shown in this figure. FIG. 3 thus shows, in addition to all of the network components depicted in FIG. 2, a satellite receiver 410 for capturing GPS ephemeris data and an ephemeris data centre 420 for receiving this ephemeris data. The ephemeris data centre 420 is communicatively connected to a broadcast server 430 which broadcasts the ephemeris data or assistance data ("A-GPS data") via the data network 300 and wireless network 200 to the wireless communications device 100 to provide the assistance data (i.e. to provide the ephemeris data to the device via the cellular link rather than via satellite download). In one implementation, the NOC 240 receives regular ephemeris updates from the broadcast server 430 (via the data network 300).

The ephemeris data could be transferred to the handhelds in a number of standard ways, e.g. by downloading the data file using TCP/IP. For example, with support from the standards body, SUPL (Secure User Plane Location architecture) could allow extended ephemeris to be transferred directly from a location server, called Serving Mobile Location Center (SMLC), to the mobile handset client using secure end-to-end IP connectivity. Providing timely ephemeris updates ("assistance data") thus helps to efficiently overcome the performance limitations of conventional GPS, thus enhancing GPS sensitivity while enabling operation under difficult signal conditions, such as urban canyons or under dense foliage.

Although assistance data is very useful, it should be appreciated that the present technology can be implemented without any A-GPS assistance data. In other words, standalone GPS can be used to geotag photographs using the pre-acquisition or anticipatory techniques described herein without recourse to A-GPS. FIGS. 2 and 3 were thus presented merely for the purposes of illustrating two different examples of networks in which this technology can be implemented.

FIG. 4 is a block diagram depicting certain main components of one example of a handheld electronic device, which is, in this particular illustration, a GPS-enabled wireless communications device 100. It should be expressly understood that this figure is intentionally simplified to show only certain components. The device 100 may include other components beyond what those shown in this figure. The device 100 includes a microprocessor 102 (or simply a processor") which interacts with memory in the form of RAM 104 and Flash Memory 106, as is well known in the art. The device 100 includes a radio-frequency (RF) transceiver 108 for communicating wirelessly with base stations 210 over cellular frequencies. The device 100 includes a GPS receiver chipset 110 for receiving GPS radio signals transmitted from one or more orbiting GPS satellites. In terms of input/output devices or user interfaces, the device 100 typically includes a display 112 {e.g. a small LCD screen), a thumbwheel and/or trackball 114, a keyboard 116, a US3 118 or serial port for connecting to peripheral equipment, a speaker 120 and a microphone 122. Optionally, the device may have a touch screen or touch-sensitive LCD interface that functions both as a display and as a user input device. In addition, the device 100 includes a digital camera 124, which is preferably embedded or incorporated within the device, of the type that are now commonly found on many smart phones or handhelds. This digital camera, which is usually a multi megapixel camera, can optionally have a built-in flash. As will be appreciated, the camera can also be externally connected to the device 100 via the USE 118 or via a Bluetooth™ connection.

Figure 7:
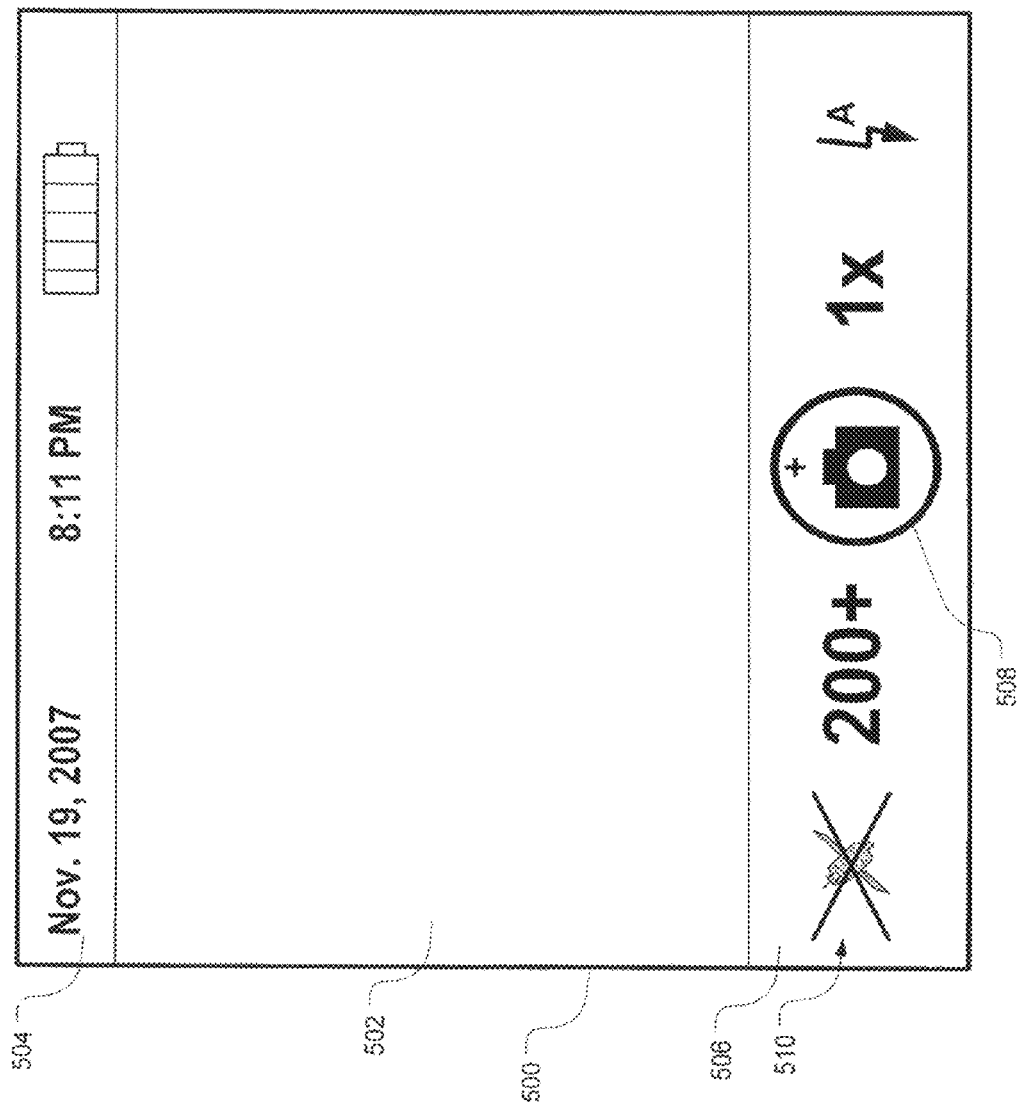
FIG. 7 is an example of a user interface for a camera showing a graphical indicator (or icon) that indicates that GPS lock has not been acquired.

As will be readily appreciated, a user of this device 100 can activate the camera by manipulating the keyboard 116 or the thumbwheel/trackball 114 to launch a camera application. Alternatively, the wireless handheld device may have a dedicated button to activate the camera. Once the camera is turned on, the viewfinder is presented on the LCD display 112 as part of a camera user interface. An example of a camera user interface is illustrated in FIG. 7. For a GPS-enabled camera, such as, for example, the Ricoh 500SE GPS-ready Digital Camera, which has a detachable GPS module, there is, of course, no "camera application" per se, since the entire device is a camera. Thus, merely turning on the camera will cause the GPS driver to assess whether ephemeris data needs to be downloaded right away in anticipation of the taking of a photograph. To recap, therefore, the handheld electronic device 100 includes a GPS receiver 110 for receiving GPS radio signals from orbiting GPS satellites and for further receiving ephemeris data for the GPS satellites, a camera 124 for taking a digital photo, and a processor 102 coupled to memory 104, 106 for monitoring user activity with respect to the camera 124 and for determining whether ephemeris data needs to be obtained for geotagging the digital photo based on a GPS position fix acquired for a current location.

Figure 5:
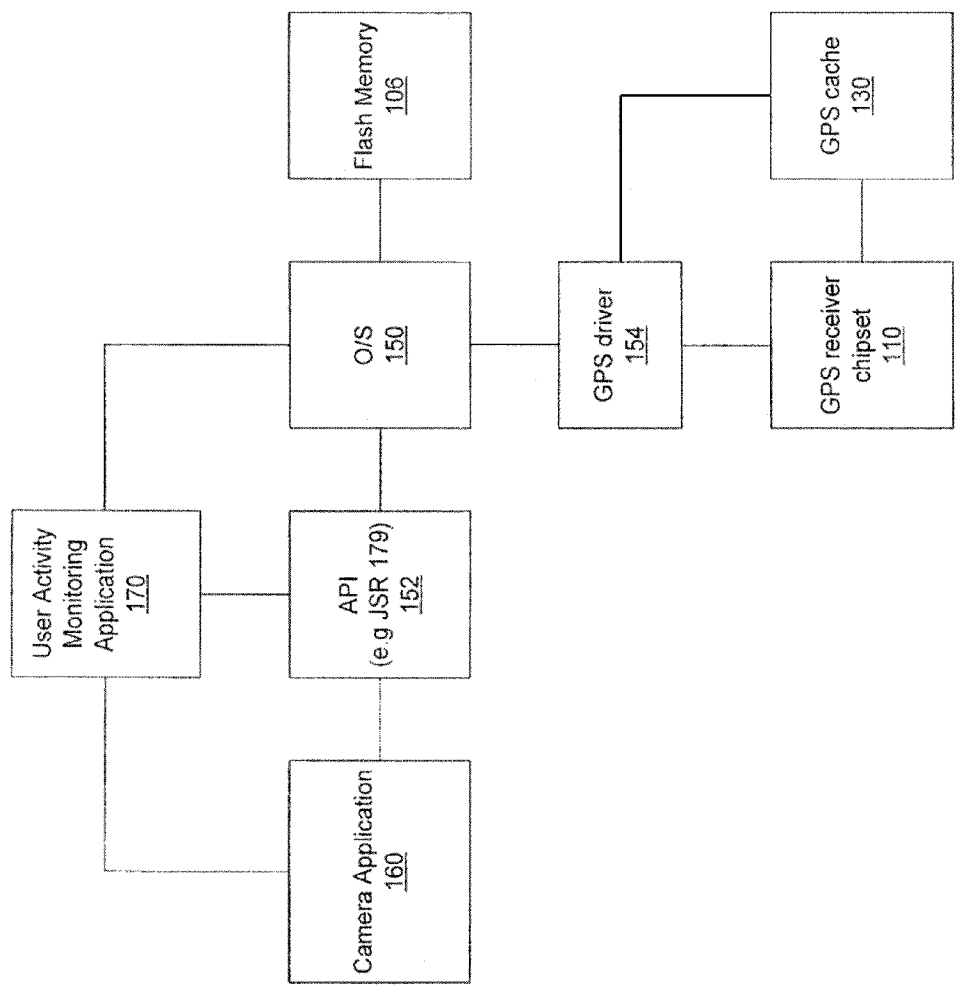
FIG. 5 is a block diagram depicting the components used to monitor user activity on a wireless communications device in order to determine when to download ephemeris data.

FIG. 5 is a block diagram depicting the components used to monitor user activity with respect to the camera ("camera-related activity") on a wireless communications device 100 or other handheld electronic device in order to determine when to pre-emptively download ephemeris data for efficiently enabling the geotagging of digital photos taken using the camera. The usual scenario involves the activation or waking of the camera (or launching of the associated camera application) by the user. This is detected as an event warranting verification by the device that it has a GPS lock in order to geotag the photo. If a GPS lock can be quickly obtained, then the photo can be geotagged accurately and immediately. Otherwise, geotagging can still be done, albeit after the fact. For example, even if a quick snap Is taken before GPS lock is acquired, the accuracy of any subsequent geotagging is improved because the device, having anticipated the need for GPS data, has already begun the process of obtained ephemeris data, if needed, and acquiring a GPS fix.

So if the user moves away from the spot where the quick snap was taken, the resultant positional error is minimized. FIG. 5 depicts one particular implementation of camera-related activity monitoring on a GPS-enabled handheld electronic device 100. In this particular implementation, device components are arranged to enable the device to monitor user activity with respect to the camera on the device. This particular arrangement of components is presented merely by way of example. As depicted in the particular implementation presented in FIG. 5, an operating system (O/S) 150 interacts with a GPS driver 154 for driving a GPS receiver chipset 110. A GPS cache 130 caches ephemeris data obtained by satellite download (standalone mode) or via wireless (cellular) link (assistance data for Assisted-GPS), which may also be stored in Flash memory 106. This ephemeris data (which defines where the satellites are in orbit) is used by the GPS driver and GPS receiver chipset to obtain a position fix for the device based on the elapsed travel time for each of the received GPS signals (using trilateration techniques well known in the art).

As further depicted in the particular implementation presented in FIG. 5, a camera application 160 that has a geotagging feature enabled communicates requests for GPS position data to API 152 (e.g. Java JSR 179) which obtains GPS data from the GPS cache 130. If there is no GPS lock, then new GPS position data needs to be obtained. In that case, the GPS driver cooperates with the GPS receiver chipset to obtain a new GPS fix, and, where needed, to obtain new ephemeris data in order to make the GPS acquisition possible.

As shown in FIG. 5, the camera application 160 can be monitored by a dedicated User Activity Monitoring Application 170 which oversees the camera application and requests made into the API from the camera application. The User Activity Monitoring Application can be integrated as a module or component of the camera application itself, the API or of other components.

In normal operation of this particular implementation of the technology, ephemeris data is downloaded pre-emptively based on any camera-related user activity, such as launching the camera application. Launching the camera application 160 would, for example, trigger a request into the API 152 (e.g. Java JSR 179) for GPS data. This request would be logged by the user activity monitoring application 170. The API 152 preferably resides between the operating system 150 and the camera application 160 so that all GPS requests go through this API. All location requests from the camera application 160 to the API 152 go to the GPS driver 154 via the OS 150, as shown in FIG. 5, which then communicates with the GPS chipset 110. The API is, in this example, Java JSR 179. JSR 179 ("Location API") is a specification defining a common API for retrieving location information on a variety of GPS-embedded mobile phones, PDAs, handhelds and other such devices.

Likewise, if a camera application is launched, or used repeatedly over a given period of time, the user activity monitoring application 170 will monitor the usage of the camera application 160 either directly or (indirectly) by the requests that the camera application 160 makes through the API 152 to the GPS driver 154 for GPS data. In other words, logging/monitoring requests through the API 152 for the GPS driver to obtain GPS fixes from the GPS chipset 110 provides an indication of user activity and allows the user activity monitoring application 170 to identify usage patterns for the camera application or for GPS requests in general.

For example, the user activity monitoring application 170 may compile behavioral data on the usage patterns of the camera. An algorithm (or even an artificial intelligence module) integrated within the monitoring application 170 could then attempt to develop correlations between camera usage (pictures taken) and date, time, and location parameters.

For example, analysis of historical usage of the camera might reveal that whenever the location of the device changes radically to a location where the user has never roamed to before, the user tends to take a photograph upon turning on the device (e-g. stepping off a plane on a vacation in a new country) but that this only occurs if the time of day is during daylight hours. As another example, the device might further observe that upon radically changing global locations, there is a delay (corresponding to arrival at the airport) where no pictures are taken, but that upon moving again to another location (e.g. beyond the airport) the picture-taking activity typically commences. This would provide a potential cue to the device to check its ephemeris and obtain a GPS fix.

As yet another example, the device might observe that photographs are often taken on Christmas Day, but always at the user's home address. Therefore, the device might deduce that while these are "family photo ops", ephemeris data is unnecessary because the user will probably not be concerned about geotagging photos taken in his own home.

The User Activity Monitoring Application 170 can also, in a variant on this implementation, extract information from a calendaring application to keyword search for special events that might be "photo ops" requiring geotagging, such as "graduation", "baptism", "wedding", "family picnic", "trip", "holiday", "tour", "vacation", etc. In some of these instances, geotagging may or may not be appropriate or desirable, and the device's artificial intelligence can attempt to guess whether ephemeris should be obtained preemptively.

FIG. 6 is an example of a simplified EXIF tag used for geotagging digital photos. The exchangeable image file format (EXIF) is a specification used by digital cameras that uses existing JPEG, TIFF, Rev. 6.0, and RIFF WAVE file formats, with the addition of specific metadata tags. Typically, an EXIF metadata tag includes tags for manufacturer, model, orientation, software, date and time YCbCr Positioning, Compression, x-Resolution, y-Resolution, Resolution Unit, Exposure Time, F Number, Exposure Program, Exif Version, Components Configuration, compressed Bits per Pixel, Exposure Bias, Maximum Aperture Value, Metering Mode, Flash, Focal Length, MakerNote, FlashPix Version, Color Space, PixelXDimension, PixelYDimension, File Source, Interoperability Index, and Interoperability Version. The EXIF tag presented in FIG. 6 is intentionally simplified to show only some of the main tags. In addition, however, the EXIF tag can be modified to accommodate geotagging data, such as by providing fields for Latitude and Longitude. Optionally, one or more further fields can be provided to store a street address, city, province, state or country associated with the geo-coordinates. This address and city information can be obtained by reverse geocoding (i.e. looking up the coordinates in a database of coordinates associated with addresses). As shown in FIG. 6, the latitude and longitude can be presented in GPS coordinates e.g. 45 deg 54.314 min N and 77 deg 30.987 min W. For example, if the latitude is expressed as 39 deg 54.333 min, this means that the seconds (32) are converted to decimal format (0.333). Alternatively, these can be expressed in the EXIF tag as Degrees Minutes Seconds—DD MM SS (e.g. 39 54 32 W) or as Decimal Degrees (e.g. 39.909 deg) in which the minutes and seconds (54 32) are converted to decimal format (0.909).

FIG. 7 is an example of a user interface for a camera showing a graphical indicator (or icon or glyph) that indicates that GPS lock has not been acquired. In this example, the camera interface 500 has a viewfinder 502, a top information bar 504 (with optional date, time and battery status indicator) and a bottom information bar 506 (with optional information pertaining to the camera, such as zoom, flash, etc.). An optional camera icon 508 can indicate that the camera has been activated. In addition, the bottom bar 506 has a GPS lock "glyph" (icon) 510 that shows, in this case, that GPS lock has not been acquired. When GPS is unlocked, the device can either freeze the camera to prevent a picture from being taken until the GPS locks, or, alternatively, the device can enable the camera to take the picture and then geotag retroactively, i.e. append the geo-coordinates afterwards.

Figure 8:
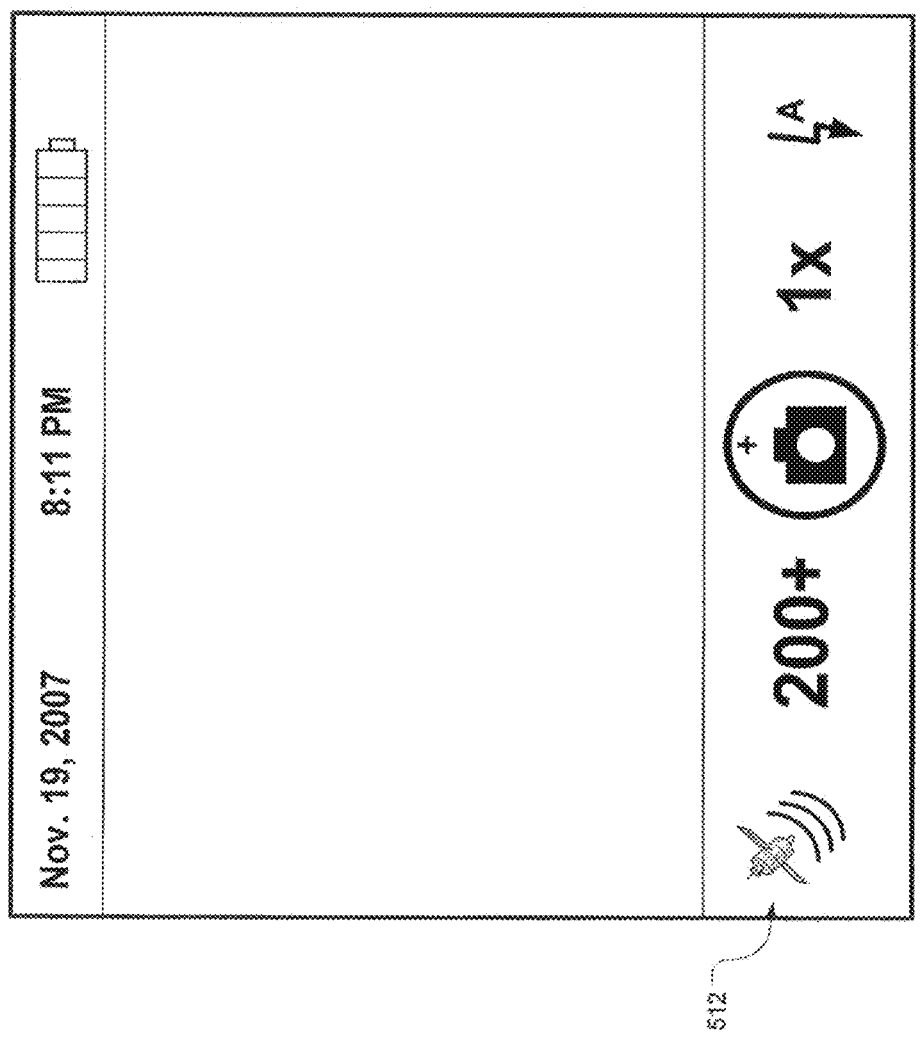
FIG. 8 is an example of a user interface for a camera showing a graphical indicator or icon) that indicates that GPS lock has been acquired.
Figure 9:
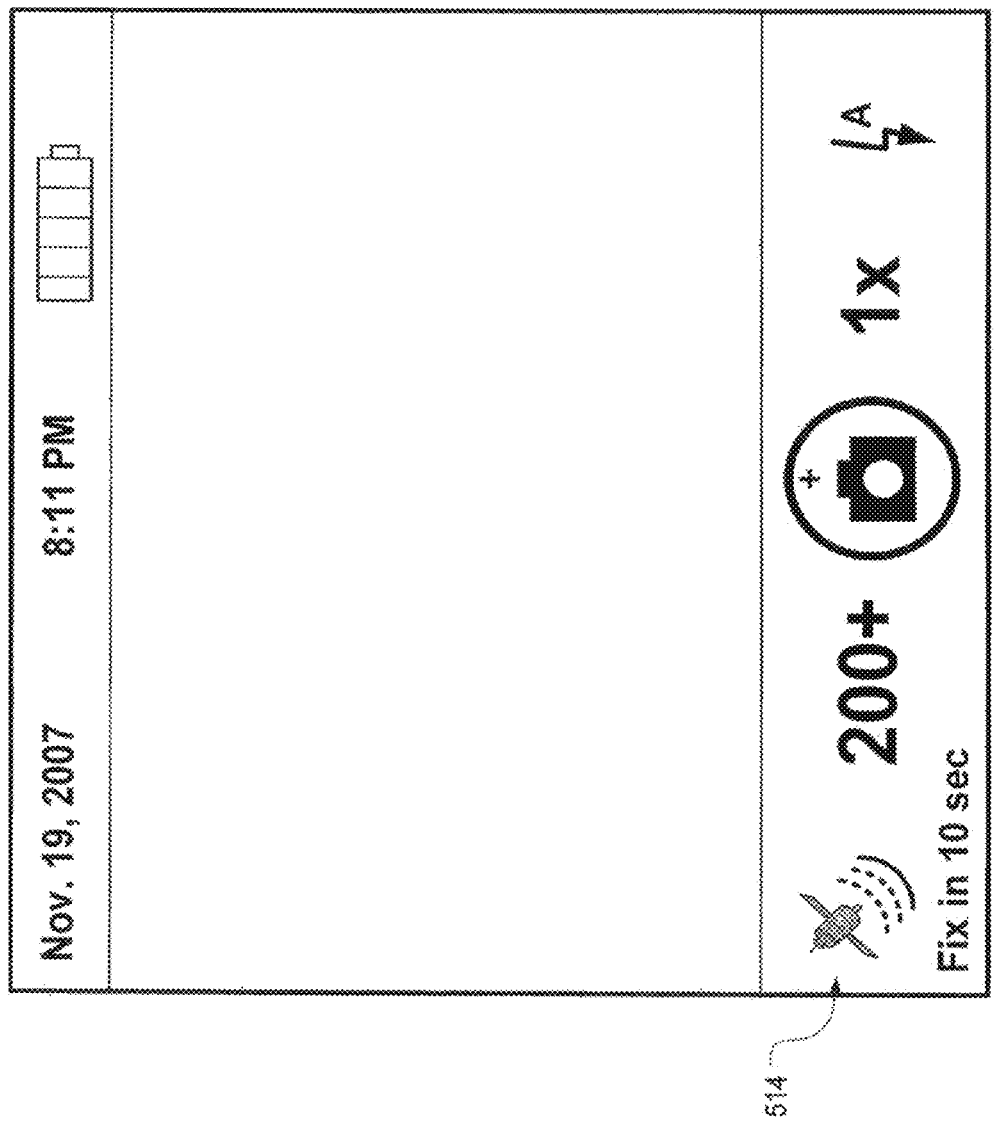
FIG. 9 is another example of a user interface for a camera showing a graphical indicator (or icon) that indicates that GPS acquisition is progressing and further showing an estimated time remaining to acquisition.

FIG. 8 is an example of a user interface 500 for a camera showing a graphical indicator (or icon) 512 that indicates that GPS lock has been acquired. In this particular implementation, "unlocked" icon 510 transforms, or is replaced by, "locked" icon 512. Once GPS lock is achieved, photos can be immediately geotagged, FIG. 9 is another example of a user interface 500 for a camera-showing a graphical indicator (or icon) 514 that indicates that GPS acquisition is progressing and further showing an estimated time remaining to acquisition. In this example, the "time to fix" shows that GPS lock with be achieved in 10 seconds. This is a useful feature because it informs the user that he or she only has to wait 10 more seconds before a photo can be taken. Also, the user can snap a photo pre-emptively knowing that GPS lock is imminent and geotagging will be accurate provided he or she doesn't move substantially over the next 10 seconds (or whatever time is showing as remaining before the GPS position fix is acquired).

Figure 10:
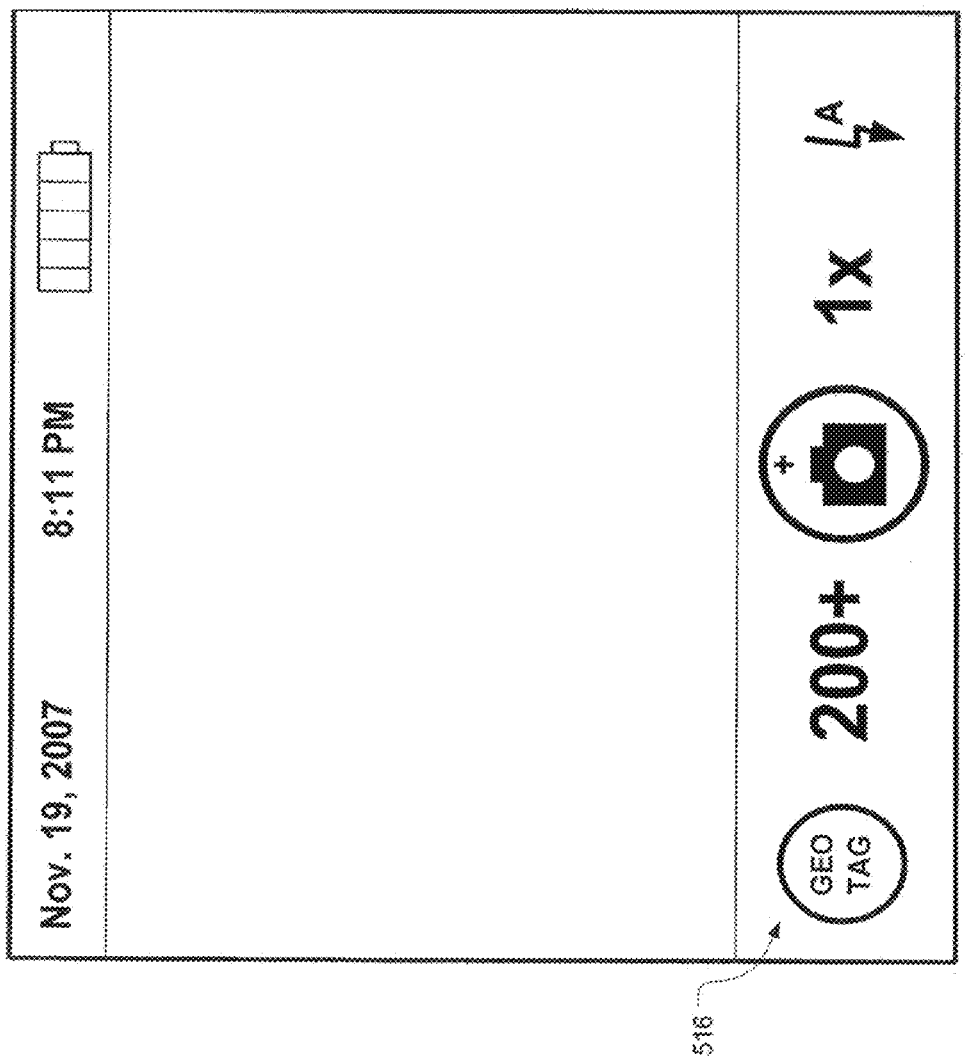
FIG. 10 is another example of a user interface for a camera showing a graphical indicator that indicates that the photo that was just taken is being, or will be, geotagged.

FIG. 10 is another example of a user interface 500 for a camera showing a graphical indicator 516 that indicates that the photo that was just taken is being, or will be, geotagged. This is useful for the user to know where geotagging is operational or feasible. In certain cases, the user will take a quick snap and then move away from the location where the picture was taken. The GPS receiver will acquire a fix a few minutes later. Depending on how far the user has strayed, the geotagging can be performed retroactively. The device can be configured to apply a specified threshold (a maximum elapsed time) beyond which the geotagging will not be done, or only done at the insistence of the user. Conversely, if the device obtains a fix within a reasonable time that is less than the predetermined threshold, the "geotag" icon will show that the geotagging is being done, or will be done.

Figure 11:
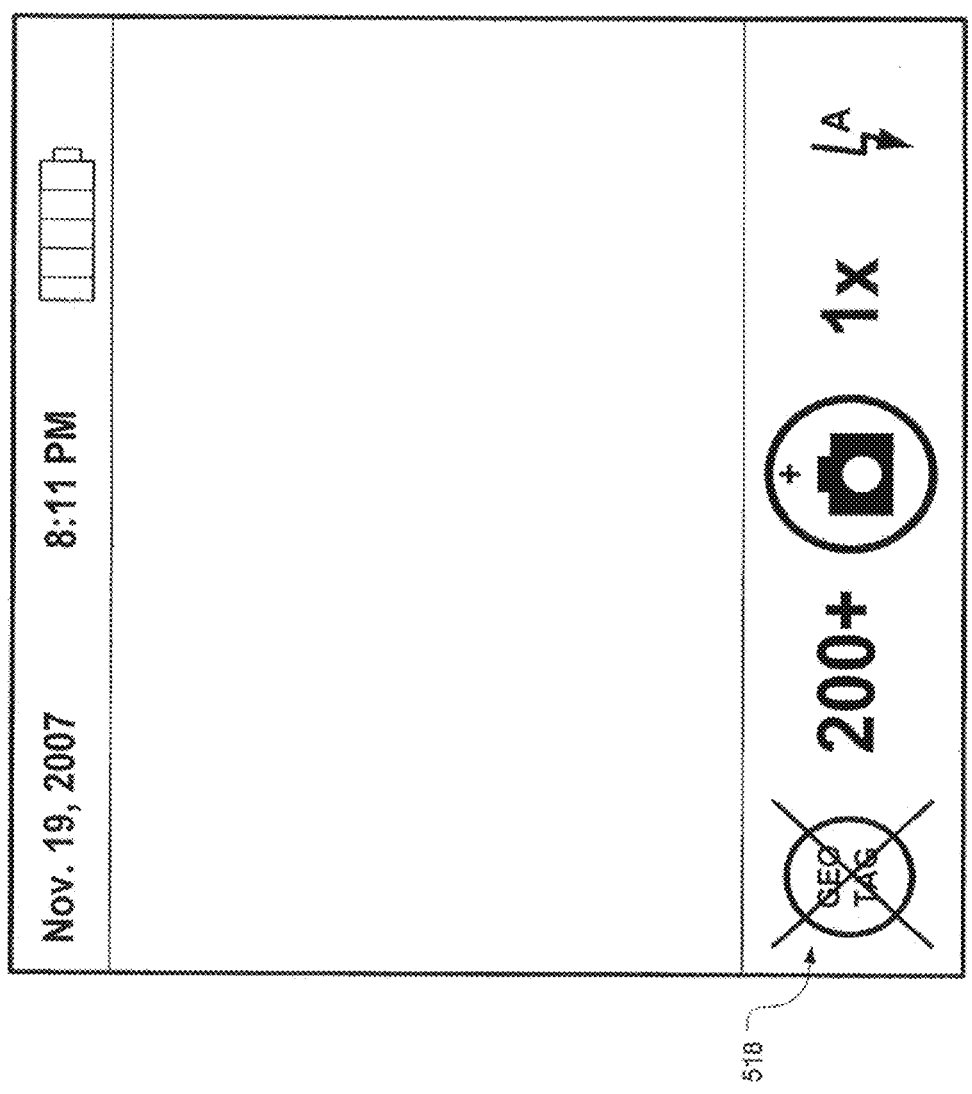
FIG. 11 is another example of a user interface for a camera showing a graphical indicator that indicates that the photo that was just taken cannot be geotagged because the time elapsed since the photo was taken and the GPS lock acquired has exceeded a specified threshold.

FIG. 11 is another example of a user interface 500 for a camera showing a graphical indicator 518 that indicates that the photo that was just taken cannot be geotagged because the time elapsed since the photo was taken and the GPS lock acquired has exceeded a specified threshold, as discussed in the previous paragraph.

FIG. 12 depicts an example of a camera options interface 600 showing a plurality of camera-related settings, including, again by way of example, a setting 602 for enabling or disabling the geotagging feature.

FIG. 13 depicts an example of a dialog box 604 that pops up over the options interface 600 when the geotagging feature is enabled. This is an optional dialog box, The device can of course be preconfigured to accept the enabling of the geotagging feature without questioning the user in this manner. Likewise, a similar dialog box could be used when the user wishes to disable the geotag feature. In another variant, the device might only question the user if the enabling or disabling of the geotagging feature is inconsistent with the usage patterns or behavioural patterns as determined by the device or an artificial intelligence built into the user activity monitoring application 170, as described above.

This new technology has been described in terms of specific implementations and configurations which are intended to be exemplary only. The scope of the exclusive right sought by the Applicant is therefore intended to be limited solely by the appended claims.

The invention claimed is:

1. A method for a mobile electronic device comprising a digital camera, a position-determining subsystem, and a user interface, the method comprising:
    detecting, by the mobile device via the user interface, user activity with respect to the digital camera of the device; and
    in response to detecting the user activity and prior to initiating capture of an image using the digital camera, initiating, by the position-determining subsystem of the mobile device, acquisition of current position data for a current position of the device.

2. The method as claimed in claim 1 wherein initiating acquisition of the current position data comprises obtaining assistance data for a satellite-based navigation-signal broadcast system.

3. The method as claimed in claim 1 wherein the initiating acquisition of the current position data comprises obtaining ephemeris data for a Global Positioning System (GPS).

4. The method as claimed in claim 1 wherein detecting user activity comprises determining whether the digital camera is being activated.

5. The method as claimed in claim 1 wherein acquisition of current position data is initiated based on a comparison of historical usage with one of a current location and time.

6. The method as claimed in claim 1 wherein the initiating acquisition of the current position data comprises obtaining data for the current position from a server.

7. The method as claimed in claim 1 wherein acquisition of the current position data is initiated when the digital camera is activated.

8. The method as claimed in claim 1 wherein the detecting user activity comprises detecting user activation of a camera application.

9. The method as claimed in claim 1 wherein detecting user activity comprises monitoring a usage pattern of the digital camera.

10. The method as claimed in claim 1, wherein initiating acquisition of the current position data comprises activating a UPS receiver.

11. The method as claimed in claim 1 further comprising capturing an image with the digital camera.

12. The method as claimed in claim 1 further comprising capturing an image with the digital camera prior to completing acquisition of a position fix.

13. The method as claimed in claim 1 wherein initiating acquisition of the current position data comprises acquiring a position fix.

14. The method as claimed in claim 1 further comprising associating an image captured by the digital camera with the acquired current position data.

15. The method as claimed in claim 1 further comprising geotagging an image captured by the digital camera with the acquired current position data.

16. The method as claimed in claim 1 further comprising displaying an indication of acquisition status for the current position data.

17. The method as claimed in claim 16 wherein the indication of acquisition status comprises an indication that UPS acquisition is progressing.

18. The method as claimed in claim 16 wherein the indication of acquisition status comprises an indication that a UPS lock has been acquired.

19. The method as claimed in claim 16 wherein the indication of acquisition status comprises an indication that UPS lock has not been acquired.

20. The method as claimed in claim 16 wherein the indication of acquisition status is selected from the group comprising: an indication that an image taken by the camera is being geotagged; an indication that an image taken by the camera will be geotagged; and an indication warning that a time elapsed between capturing an image and a subsequent position fix has exceeded a specified threshold.

21. The method as claimed in claim 1 wherein the image is a digital photograph.

22. The method of claim 1 wherein acquisition of the position data is in response to detecting user activation of the camera application.

23. A non-transitory computer medium comprising code which, when loaded into memory and executed on a processor of a mobile electronic device comprising a digital camera, a position-determining subsystem, is a user interface, causes the device to perform the acts of:
   detecting, by the mobile device via the user interface, user activity with respect to the digital camera of the device; and
   in response to detecting the user activity and prior to initiating capture of an image using the digital camera, initiating, by the position-determining subsystem of the mobile device, acquisition of current position data for a current position of the device.

24. The computer readable medium as claimed in claim 23 wherein initiating acquisition comprises obtaining ephemeris data for a satellite-based navigation-signal broadcast system.

25. The computer readable medium as claimed in claim 23 wherein initiating acquisition comprises obtaining ephemeris data for a Global Positioning System (GPS).

26. The computer readable medium as claimed in claim 23 wherein detecting user activity comprises detecting user activation of the digital camera.

27. The computer readable medium as claimed in claim 23 wherein acquisition of current position data is initiated based on a comparison of historical usage with one of a current location and time.

28. The computer readable medium as claimed in claim 23 wherein the initiating acquisition of the current position data comprises obtaining data for the current position from a server.

29. The computer readable medium as claimed in claim 23 wherein acquisition of the current position data is initiated when the digital camera is activated.

30. The computer readable medium as claimed in claim 23 wherein the detecting user activity comprises detecting user activation of a camera application.

31. The computer readable medium as claimed in claim 23 wherein detecting user activity comprises monitoring a usage pattern of the digital camera.

32. The computer readable medium as claimed in claim 23 wherein initiating acquisition of the current position data comprises activating a GPS receiver.

33. The computer readable medium as claimed in claim 23 further comprising capturing an image with the digital camera.

34. The computer readable medium as claimed in claim 23 further comprising capturing an image with the digital camera prior to completing acquisition of a position fix.

35. The computer readable medium as claimed in claim 23 wherein initiating acquisition of the current position data comprises acquiring a position fix.

36. The computer readable medium as claimed in claim 23 further comprising associating an image captured by the digital camera with the acquired current position data.

37. The computer readable medium as claimed in claim 23 further comprising geotagging an image captured by the digital camera with the acquired current position data.

38. The computer readable medium as claimed in claim 23 further comprising displaying an indication of acquisition status for the current position data.

39. The computer readable medium as claimed in claim 38 wherein the indication of acquisition status comprises an indication that GPS acquisition is progressing.

40. The computer readable medium as claimed in claim 38 wherein the indication of acquisition status comprises an indication that a GPS lock has been acquired.

41. The computer readable medium as claimed in claim 38 wherein the indication of acquisition status comprises an indication that GPS lock has not been acquired.

42. The computer readable medium as claimed in claim 38 wherein the indication of acquisition status is selected from the group comprising: an indication that an image taken by the camera is being geotagged; an indication that an image taken by the camera will be geotagged; and an indication warning that a time elapsed between capturing an image and a subsequent position fix has exceeded a specified threshold.

43. The computer readable medium as claimed in claim 23 wherein the image is a digital photograph.

44. A mobile electronic device comprising:
   a digital camera for capturing an image;
   a user interface;
   a position-determining subsystem; and
   a processor that is configured to detect, via the user interface, user activity with respect to the digital camera and for causing the position-determining subsystem to initiate acquisition of current position data for a current position of the device in response to detecting the user activity and prior to initiating capture of the image using the digital camera.

45. The mobile electronic device as claimed in claim 44 wherein the position-determining subsystem is a Global Positioning System (GPS) receiver which the processor operates using a GPS driver in association with a GPS cache stored in the memory of the device.

46. The mobile electronic device as claimed in claim 44 wherein the processor obtains ephemeris data from the GPS cache.

47. The mobile electronic device as claimed in claim 44 wherein the memory stores a user activity monitoring application that is executed by the processor to detect user activity.

48. The mobile electronic device as claimed in claim 47 wherein the user activity monitoring application detects Whether the digital camera is being activated.

49. The mobile electronic device as claimed in claim 47 wherein the user activity monitoring application initiates acquisition of the current position data based on a comparison of historical usage of the digital camera with one of a current location and time.

50. The mobile electronic device as claimed in claim 44 wherein the processor geotags the image by using event data in a calendar application.

51. The mobile electronic device as claimed in claim 44 comprising a user activity monitoring application that logs all requests to an API for current position data, the API residing between the camera application and an operating system.

52. The mobile electronic device as claimed in claim 44 wherein the processor is configured to initiate acquisition of the current position data by obtaining data for the current position from a server.

53. The mobile electronic device as claimed in claim 44 wherein the processor is configured to initiate acquisition of the current position data when the digital camera is activated.

54. The mobile electronic device as claimed in claim 44 wherein the processor is configured to detect user activity by detecting user activation of a camera application.

55. The mobile electronic device as claimed in claim 44 wherein the processor is configured to detect user activity by monitoring a usage pattern of the digital camera.

56. The mobile electronic device as claimed in claim 44 wherein the processor is configured to initiate acquisition of the current position data by activating a GPS receiver.

57. The mobile electronic device as claimed in claim 44 comprising a memory for storing the image captured by the digital camera.

58. The mobile electronic device as claimed in claim 44 comprising a memory for storing the image captured by the digital camera prior to completing acquisition of a position fix.

59. The mobile electronic device as claimed in claim 44 wherein the processor is configured to initiate acquisition of the current position data by acquiring a position fix.

60. The mobile electronic device as claimed in claim 44 wherein the processor is configured to associate an image captured by the digital camera with the acquired current position data.

61. The mobile electronic device as claimed in claim 44 wherein the processor is configured to geotag an image captured by the digital camera with the acquired current position data.

62. The mobile electronic device as claimed in claim 44 wherein the processor is configured to display an indication of acquisition status for the current position data.

63. The mobile electronic device as claimed in claim 62 wherein the indication of acquisition status comprises an indication that UPS acquisition is progressing.

64. The mobile electronic device as claimed in claim 62 wherein the indication of acquisition status comprises an indication that a GPS lock has been acquired.

65. The mobile electronic device as claimed in claim 62 wherein the indication of acquisition status comprises an indication that GPS lock has not been acquired.

66. The mobile electronic device as claimed in claim 62 wherein the indication of acquisition status is selected from the group comprising: an indication that an image taken by the camera is being geotagged; an indication that an image taken by the camera will be geotagged; and an indication warning that a time elapsed between capturing an image and a subsequent position fix has exceeded a specified threshold.

67. The mobile electronic device as claimed in claim 44 wherein the image is a digital photograph.

* * * * *

UNITED STATES PATENT AND TRADEMARK OFFICE
CERTIFICATE OF CORRECTION

PATENT NO.       : 9,766,342 B2
APPLICATION NO.  : 14/490004
DATED            : September 19, 2017
INVENTOR(S)      : Piotr Konrad Tysowski, Ngoc Bich Ngo and David Noel Vanden Heuvel It is certified that error appears in the above-identified patent and that said Letters Patent is hereby corrected as shown below:

In the Claims

- In Claim 10, Column 12, Line 53, change "UPS" to "GPS";

- In Claim 17, Column 13, Line 6, change "UPS" to "GPS";

- In Claim 18, Column 13, Line 9, change "UPS" to "GPS";

- In Claim 19, Column 13, Line 12, change "UPS" to "GPS";

- In Claim 23, Column 13, Line 28, change "is" to "and";

- In Claim 48, Column 14, Line 65, change "Whether" to "whether";

- In Claim 63, Column 16, Line 17, change "UPS" to "GPS".

Signed and Sealed this
Seventh Day of November, 2017

Joseph Matal
*Performing the Functions and Duties of the*
*Under Secretary of Commerce for Intellectual Property and*
*Director of the United States Patent and Trademark Office*